B. H. PARKER, A. H. LANGE & V. S. PERAZIO.
PIPE COUPLING.
APPLICATION FILED APR. 21, 1911.
1,058,255.
Patented Apr. 8, 1913.
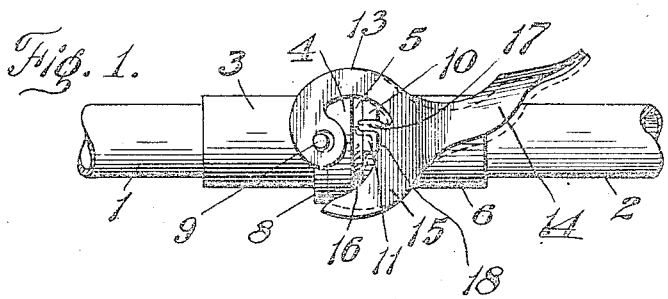
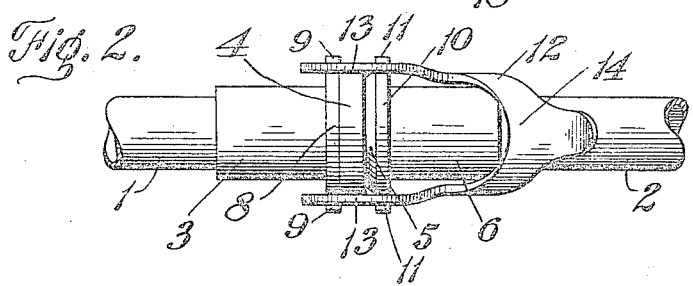
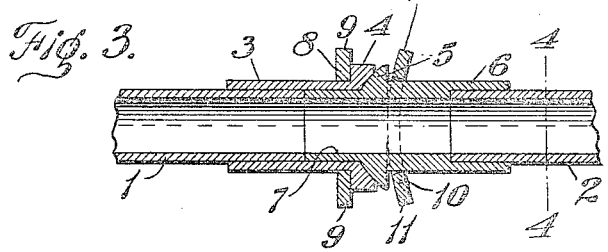 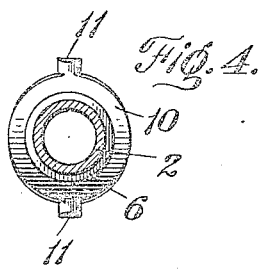
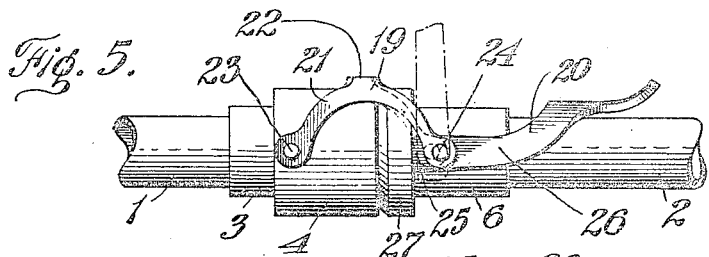
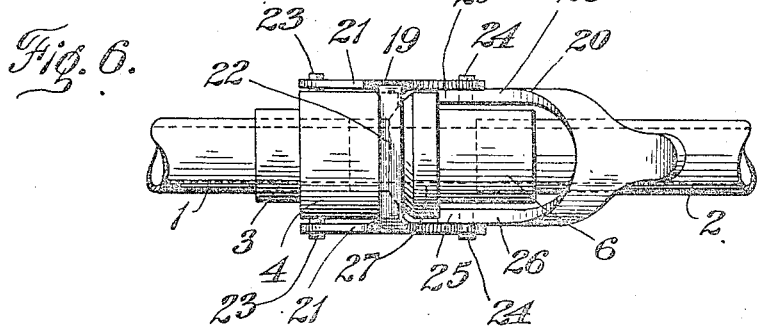
Witnesses
Chas. W. Stauffiger.
Anna C. Raviler
Inventors
Burton H. Parker.
Arthur H. Lange.
Valentine S. Perazio.
By
Attorneys

UNITED STATES PATENT OFFICE.

BURTON H. PARKER, ARTHUR H. LANGE, AND VALENTINE S. PERAZIO, OF DETROIT, MICHIGAN.

PIPE-COUPLING.

1,058,255.　　　　Specification of Letters Patent.　　Patented Apr. 8, 1913.

Application filed April 21, 1911. Serial No. 622,433.

*To all whom it may concern:*

Be it known that we, BURTON H. PARKER and ARTHUR H. LANGE, citizens of the United States of America, and VALENTINE S. PERAZIO, a subject of the King of Italy, all residing at Detroit, in the county of Wayne and State of Michigan, have invented certain new and useful Improvements in Pipe-Couplings, of which the following is a specification, reference being had therein to the accompanying drawings.

This invention relates to pipe couplings adapted to quickly and adjustably connect the ends of pipes, tubes, etc., and especially adapted to detachably connect the small, light tubes used in automobile construction to conduct gasolene or lubricant to the motor from a distant source of supply, and its object is to provide a device for the purpose which may be quickly and easily operated without the use of wrenches or other tools to couple or uncouple the ends of pipes or other tubing.

To this end the invention consists in providing a very simple, cheap, and efficient device which may be quickly assembled and operated and is so constructed as to obviate the necessity for springs and when turned to inoperative position, affords free access to the end of the tube or pipe for the insertion and connection of the mating tube therewith. And further, the invention consists in providing the device with certain other new and useful features all as hereinafter more fully described reference being had to the accompanying drawing in which, Figure 1 is a side elevation of a device embodying the invention with the parts in operative position; Fig. 2 is a plan view of the same; Fig. 3 is a longitudinal section with the cam lever removed; Fig. 4 is a transverse section on the line 4—4 of Fig. 3; Fig. 5 is a view similar to Fig. 1 showing a modified construction; and Fig. 6 is a plan view of the same.

As shown in the drawing 1 and 2 represent the adjacent ends of pipes or tubes, the tube 1 being provided with a head 3 having a flange 4 formed with a concave seat adapted to be engaged by the convex side of a flange 5 on a head 6 secured to the adjacent end of the tube 2. The head 6 is provided with a lead or nipple 7 to project into the head 3 and hold the heads in alinement.

Loosely sleeved upon the head 3 is a ring 8 adapted to engage the shoulder formed by the flange 4 and this ring is provided with oppositely disposed integrally formed studs or pivots 9. A similar ring 10 preferably formed of spring steel is sleeved upon the head 6 to abut the shoulder formed by the flange 5 and this ring is also formed with oppositely disposed studs 11. This ring 10 is bent or curved transversely to engage the flange 5 intermediate its studs 11 only, and if found desirable, rings 8 may be similarly bent.

The head 6 is drawn into contact with and firmly held against its seat in the head 3 by means of a yoke lever 12 which is preferably formed of a single piece of sheet metal cut and bent to form parallel curved spring arms 13 which are united by a connecting yoke portion 14 forming a handle to operate the lever. In the free ends of the arms 13 are holes to receive the studs 9 on the ring 8, the lever thus being pivotally attached to the head 3 by means of said ring. Extending downward from the opposite or inner ends of the arms 13 and connecting yoke 14, are two curved arms or lugs 15, each formed with a curved side or edge 16 adapted to engage the studs 11 on the ring 10, said edge being curved eccentrically to the axis of rotation of the lever upon the studs 9. At the lower ends of the lugs, the curved edge 16 lies at such a distance from the axis of rotation of the lever upon the studs 9 that said lugs will readily hook over the outwardly extending ends of the studs 11 of the ring 10 when the lever is turned toward the same, and by reason of the eccentricity of said edge 16, the heads will be firmly drawn toward each other as the lever is turned downward. The arms 13 of the yoke lever are curved and preferably made of spring metal so that they will yield as shown in dotted lines in Fig. 1, and thus serve as a spring to firmly hold the heads in contact and to yield in turning the yoke lever into locked position. The ring 10 being curved transversely also serves as a spring to yield and spring press the heads into contact.

If found desirable, a plain ring similar to the ring 8 may be employed in place of the spring or yielding ring 10 and the arms 13 depended upon to give the necessary spring action. It is also obvious that the yoke lever may be made so that it will not yield and the necessary spring action secured through the medium of the ring 10. A further yielding action may be secured by substituting for the ring 8 a spring ring similar to the ring 10. When the yielding action is secured solely by means of the spring arms of the yoke lever, the rings 8 and 10 may be dispensed with and suitable studs provided upon the heads, as shown in Figs. 5 and 6.

At the inner end of the curved edges 16 of the arms 15 on the lever, are short lugs 17 forming stops to engage studs 11 and limit the turning of the lever. Adjacent to these stops are slight notches 18 to receive the studs 11 and hold the lever in locked position against accidental disengagement by constant vibration of the parts when the device is used in automobile construction. In this construction the clamping lever is formed from a single piece of metal and also serves as a spring to firmly hold the ends of the pipes together. The device may be cheaply made and quickly assembled, the eyes in the arms of the yoke lever being sprung into engagement with the studs 9 in assembling the parts.

In the construction shown in Figs. 5 and 6, the clamp for securing the heads together is formed in two parts comprising a spring yoke 19 and a handle yoke lever 20. The spring yoke is formed with curved side arms 21 having an opening in each end and the two spring arms are connected intermediate their ends by a cross bar 22. These spring arms are pivotally attached at one end to the head 3 by means of studs 23 on the head engaging the openings in the ends of the arms. The opposite ends of these spring arms are attached to the yoke lever near the end of its arms 26 by pivot pins 24, the ends 25 of said parallel arms 26 of the yoke lever extending beyond the pivots 24 and forming cam ends to engage the shoulder formed by the flange 27 on the head 6 and force said head into engagement with the head 3 when the spring yoke 19 is swung downward and the yoke lever 20 then turned downward upon the tube 2. The curved arms 21 as shown in dotted lines in Fig. 5, are adapted to yield when the yoke lever is turned and by their spring action firmly hold the heads in contact.

Having thus fully described our invention what we claim is:—

1. In a pipe coupling, the combination with pipe sections having heads, of a ring shaped member engaging one head and bent transversely, and means engaging said member for drawing said heads toward each other, said member being adapted to yield longitudinally of said head by reason of said transverse bend.

2. In a pipe coupling, the combination with pipe sections having heads, of a ring shaped member on one section in engagement with its head and having diametrically disposed studs and curved in the direction of the diametrical line of the studs, and means engaging said studs for holding the heads in contact.

3. In a pipe coupling, the combination of pipe sections, heads on the pipe sections each formed with outwardly extending flanges, one head being provided with a seat for the other head, ring members sleeved on the heads in engagement with the flanges and having laterally extending oppositely disposed studs, one of said ring members being curved transversely to engage the flange of the head intermediate its studs, and a yoke lever having spring arms pivotally engaging the studs on one ring member and provided with cam projections to engage the studs on the other ring member.

In testimony whereof we affix our signatures in presence of two witnesses.

BURTON H. PARKER.
ARTHUR H. LANGE.
VALENTINE S. PERAZIO.

Witnesses:
LEWIS E. FLANDERS,
ANNA C. RAVILER.